(No Model.) 2 Sheets—Sheet 1.

J. McD. ROGERS.
SPRING PROPELLED VEHICLE.

No. 424,903. Patented Apr. 1, 1890.

Witnesses
N. B. Harris
E. P. Jones

Inventor
John McD. Rogers
By Acker and Morsell
His Attorneys (No Model.) 2 Sheets—Sheet 2.
J. McD. ROGERS.
SPRING PROPELLED VEHICLE.
No. 424,903. Patented Apr. 1, 1890.
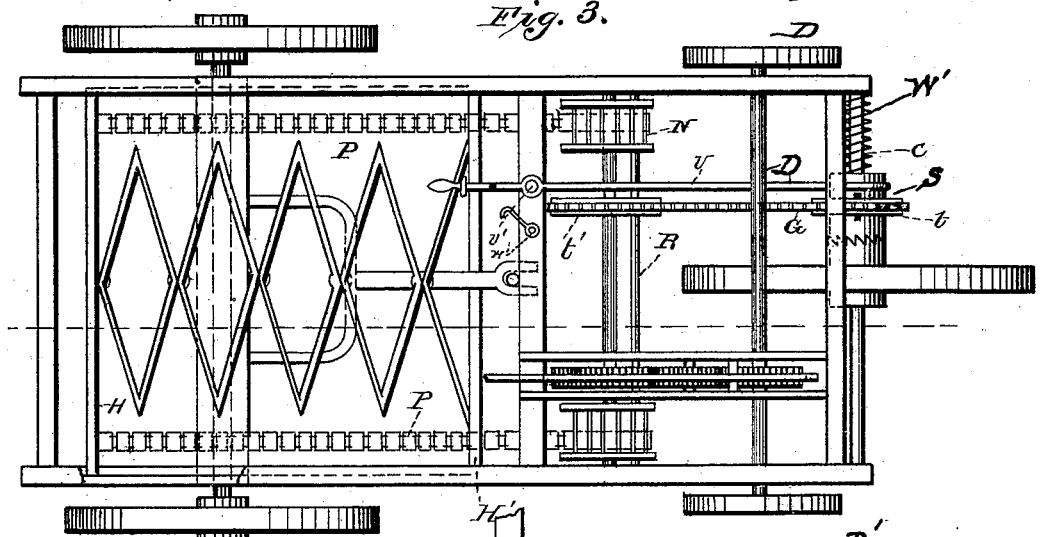
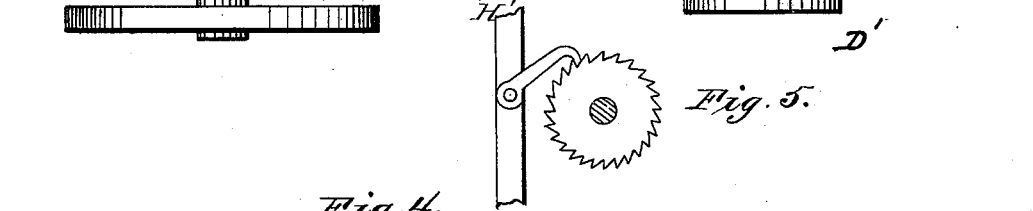
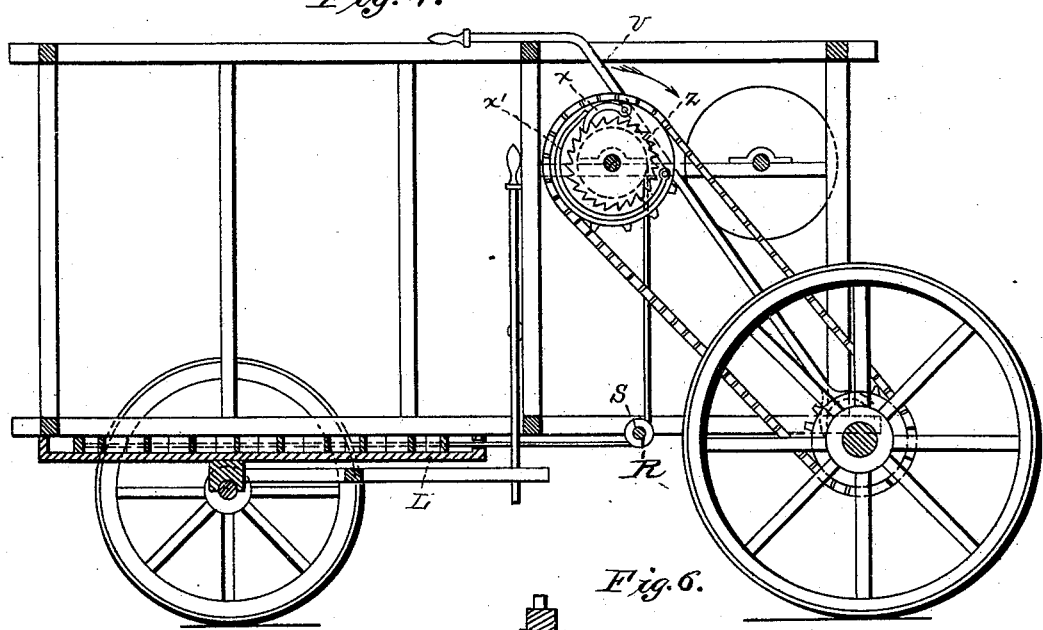
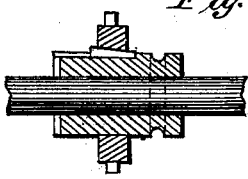
Witnesses
N. B. Harris
E. P. Jones
Inventor
John McD. Rogers,
By Acker and Morell
His Attorneys
N. PETERS, Photo-Lithographer, Washington, D. C.

UNITED STATES PATENT OFFICE.

JOHN McDONALD ROGERS, OF POWELLVILLE, SOUTH CAROLINA.

SPRING-PROPELLED VEHICLE.

SPECIFICATION forming part of Letters Patent No. 424,903, dated April 1, 1890.

Application filed January 17, 1890. Serial No. 337,231. (No model.)

*To all whom it may concern:*

Be it known that I, JOHN MCDONALD ROGERS, a citizen of the United States, residing at Powellville, in the county of Horry and State of South Carolina, have invented certain new and useful Improvements in Spring-Propelled Vehicles; and I do declare the following to be a full, clear, and exact description of the invention, such as will enable others skilled in the art to which it appertains to make and use the same, reference being had to the accompanying drawings and to the letters of reference marked thereon, which form a part of this specification.

My invention relates to improvements in spring-propelled vehicles; and it consists in the particular construction of parts hereinafter fully described, and specifically pointed out in the claims at the end of this specification.

Figure 1:
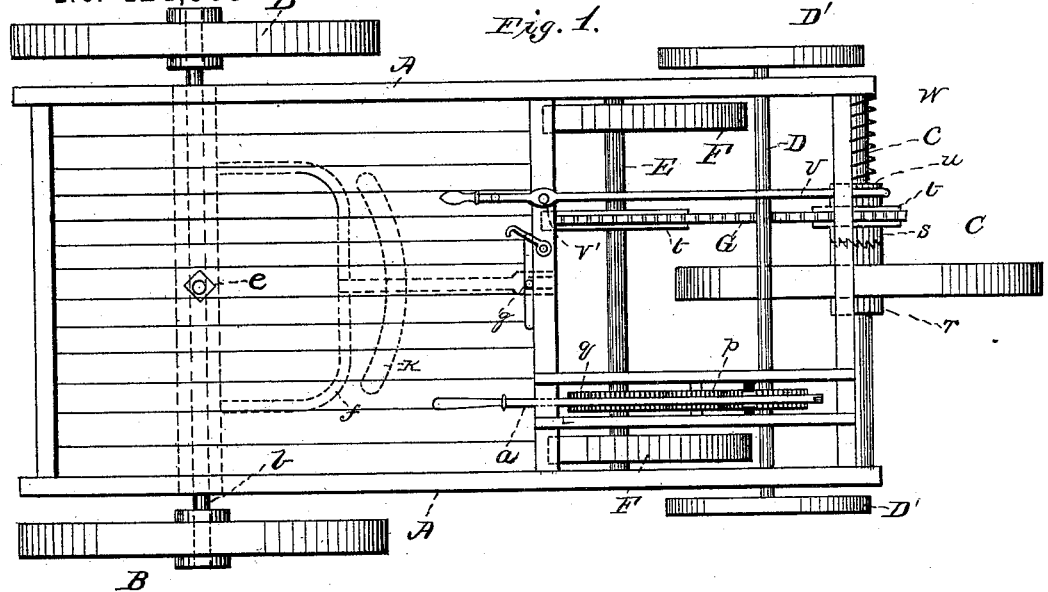
Figure 2:
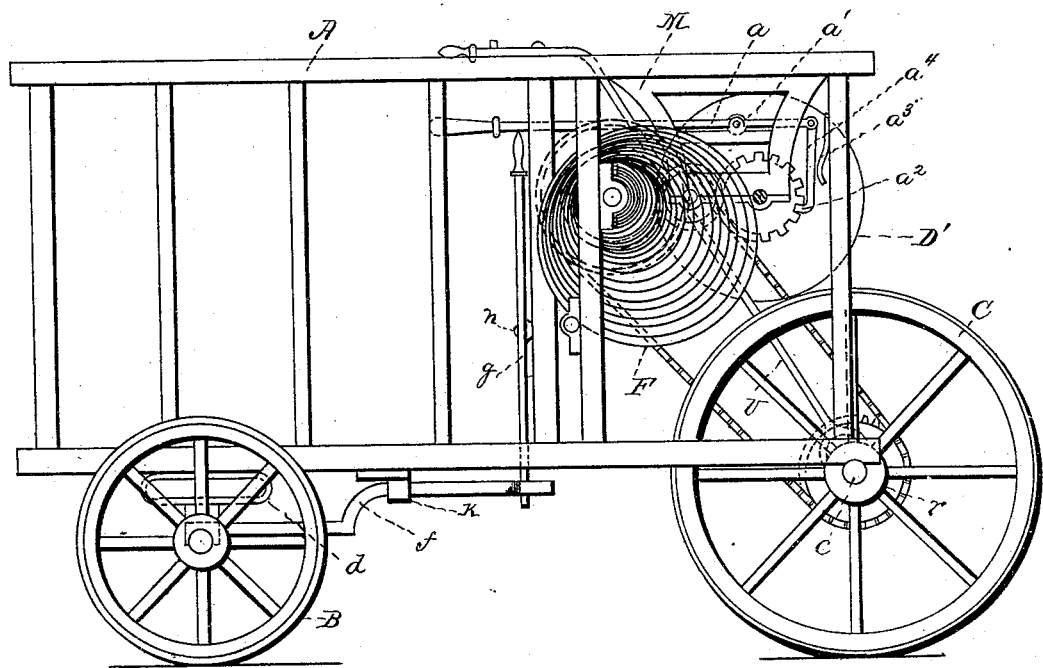

Figure 1 of the drawings is a top plan view of my vehicle. Fig. 2 is a side elevation with certain parts severed. Fig. 3 is a top plan view of my vehicle arranged to use a modified form of springs. Fig. 4 is a longitudinal vertical section on the line $x\,x$, Fig. 3. Fig. 5 is a detail view of mechanism to prevent lost power in springs, and Fig. 6 is a section through the clutch mechanism.

Similar letters refer to similar parts throughout the several views.

The body of my vehicle consists, preferably, of a rectangular frame A, composed of two top rails and two bottom rails connected by vertical and horizontal cross-bars, as clearly shown in the drawings. This body is carried upon any suitable running-gear, shown as consisting of the rear axle $b$, carrying the wheels B B, and the front axle $c$, carrying the wheel C. The rear axle $b$ is free to turn with relation to the body A on the pivot $e$ in the usual manner.

$f$ is a bar connected at its rear end to the axle $b$.

$k$ is a slotted retaining-piece attached to the under side of the body, through which slotted piece the bar $f$ passes. Said bar $f$ is bifurcated at its forward end. By means of the hand-lever $g$, pivoted at $h$, the lower end of which enters the bifurcated end of bar $f$, the vehicle can be guided and turned in the direction desired.

The wheel C is formed with a hub $r$, which is rigidly attached to the axle $c$.

$s$ is a collar mounted to turn loosely upon the shaft or axle $c$.

$t$ is a sprocket-wheel carried by the collar $s$, said wheel and collar being free to move longitudinally with respect to each other, but turning together by means of a spline and feather. One end of the collar $s$ is provided with teeth or serrations to engage with like teeth or serrations on the hub of wheel C. The loose collar $s$ near the other end is provided with a circumferential groove adapted to receive the forks of a bifurcated lever $v$, pivoted at $v'$ to a cross-bar of the frame. The collar $s$ is rotated by means of the sprocket-chain G, which chain transmits the motion of the sprocket-wheel $t'$, loosely mounted on the power-shaft E, to the sprocket-wheel $t$ on the collar $s$. By means of the lever $v$ the collar $s$, forming one member of the clutch, can be engaged with and disengaged from the hub $r$, forming the other member of the clutch, at pleasure.

$w$ is a spiral spring mounted on shaft C for normally holding the parts of the clutch engaged. Any suitable catch or fastening device may be used for locking the lever $v$ in the position it assumes when the parts of the clutch are separated. A simple catch-pawl $w'$, adapted to engage the handle end of the lever $v$, is shown for the purpose.

E is the power-shaft, mounted in bearings attached to vertical cross-bars of the frame or body A. On shaft E are mounted one or more power-springs F F, the expansion of which rotates the power-shaft E, as hereinafter explained. Rigidly mounted on shaft E closely adjacent to the sprocket-wheel $t'$ is a ratchet-wheel $z$, somewhat smaller in circumference than the sprocket-wheel $t'$.

$x$ is a pawl pivoted on the side face of the sprocket-wheel $t'$ next the ratchet $z$.

$x'$ is a spring attached to the sprocket-wheel at one end, the free end bearing upon the pawl $x$ to keep the same in contact with the ratchet.

It will be apparent that when motion is imparted to the shaft E in the direction indicated by the arrow the sprocket-wheel $t'$ will be rotated, and by means of the chain will rotate the collar $s$ and the axle $c$.

The springs are mounted to rotate the shaft E in the direction of the arrow shown in Fig. 4. It will also be clear that when the shaft E is rotated in the other direction the ratchet z will slip by the pawl, thus enabling the springs to be compressed or "wound up."

The mechanism shown for winding the springs will now be described.

D is a shaft mounted in bearings carried by brackets m, depending from the top rails of the frame or body A. On the shaft D are mounted one or more balance-wheels D'.

o is a gear-wheel mounted on the shaft D, and which meshes with a second gear p, mounted on a short shaft having bearings in the bracket m, which second gear p meshes with a gear q, rigidly secured to the power-shaft E, above referred to.

a is a lever pivoted at a' to a cross-piece on the bracket m. At the forward end of the lever a is pivoted the downhanging arm $a^4$, which has a bent portion $a^2$ to engage the teeth of the gear o.

$a^3$ is a spring to normally hold the portion $a^2$ in engagement with the gear o.

From the foregoing it will be obvious that when the lever a is moved on its pivot the gear-wheel o will be rotated, which by means of the gears p and q will rotate the power-shaft, and thus compress or wind up the spring or springs F.

Any suitable brake may be applied to the running-gear of the vehicle. A seat may, and in practice will, be located on the frame A in convenient position for the operator to reach the three hand-levers.

In Fig. 5 of the drawings I have illustrated mechanism for saving the power of the springs when the vehicle is running by gravity or when traveling on a downgrade. It consists of a ratchet-wheel z', with its teeth pointing in the same direction as those of the ratchet z, and a pawl or dog $z^2$, pivoted to a vertical piece extending from beneath the cross-bar of the frame to the rear of the power-shaft and in such position that the ratchet-wheel z', which it engages, will be located about centrally upon the power-shaft E. On reaching an incline to be descended the operator will lock the shaft E from rotation by the pawl $z^2$ and ratchet z', as above explained, then move the collar s away from the hub r by moving the lever v, and fasten the lever v in such position, whereupon the vehicle can run down the incline by gravity, the speed being controlled by the brake.

Instead of using circular springs mounted on the shaft E, a series of approximately diamond-shaped springs may be arranged below the frame or body A, as shown in Figs. 3 and 4 of the drawings. One of the end springs of the series is attached to a rigid cross-bar H', forming one end of a casing L for inclosing the springs. The other end spring of the series is attached to a sliding cross-bar H. On the shaft E near each of its ends are two reels or pulleys N. Attached to each of these pulleys is a chain, cord, or belt P. Mounted in bearings in the bottom rails of the frame a little in front of a vertical line passing through the shaft E is another shaft R. On the shaft R near each end are rollers S. The chains or belts P pass down from the reels N over the rollers S, then through slots in the bar H, and back to the bar H'. It will be obvious that rotation of the shaft E by the winding mechanism above described will compress the springs, which, upon being released, will draw upon the chains or belts and rotate the shaft E in the direction to propel the vehicle. This construction will be found to be the best and preferred plan for heavy work. It is obvious, also, in order to simplify the construction when the modified form is employed, that the shaft R and the rollers S used in connection therewith may, without departing from the spirit of my invention, be dispensed with and the power-shaft E and its adjuncts placed in the position occupied by said shaft R. It is apparent that in this position, and with very little change being necessary, the compression and expansion of the diamond-shaped springs may be accomplished, and in this way, also, a number of parts may be dispensed with and friction reduced considerably.

My vehicle is well adapted for the use of invalids and cripples who are deprived of the use of their legs, but who have the use of their arms.

My invention, whole or in part, can be applied with advantage to toy vehicles, as well as to vehicles of a size suitable for road service, and the means or mechanism employed by me can also be applied with advantage to propelling small boats and other floating crafts.

Having thus fully described my invention, what I claim is—

1. The combination, with the body and running-gear of a vehicle, the shaft E, and the springs for rotating said shaft, of the ratchet-wheel z, fast on said shaft, the sprocket-wheel t', loose on shaft E and carrying the pawl x, the collar s, loose on the axle, the sprocket-wheel t, mounted on the collar and arranged to rotate with said collar and to allow the collar to move longitudinally independently thereof, and means for moving the collar s lengthwise of the axle, as set forth.

2. The combination, with the body and running-gear of a vehicle, of the shaft E, the gear q thereon, and springs for rotating said shaft, the gears o and p, the lever a, having the arm $a^4$, and bent portion $a^2$, substantially as and for the purpose set forth.

3. The combination of the body and running-gear of a vehicle, a power-shaft, springs for rotating said shaft, a ratchet-wheel fast on said shaft, a sprocket-wheel loose on said shaft and carrying a pawl for engaging the ratchet-wheel, a front axle having rigidly mounted thereon the front wheel, a collar loose on the axle and provided on one end with teeth to engage the toothed end of the hub of the wheel and near the opposite end with a circumferential groove, a sprocket-wheel mounted upon the loose collar and provided with a groove which receives a spline or feather arranged upon said collar, a chain or belt connecting this sprocket-wheel with the sprocket upon the power-shaft, a pivoted hand-lever provided with a forked end for engaging the circumferential groove of the loose collar, and a hook for engaging the rear end of the lever, substantially as set forth.

4. The combination, with a body and running-gear of a vehicle, a power-shaft, springs for rotating said shaft, a central ratchet-wheel rigidly mounted upon said shaft, and a pawl pivoted to a vertical standard and adapted to engage said ratchet-wheel for the purpose of locking said shaft from rotation, of a loose collar upon the axle and means for engaging said collar with and disengaging from the hub fast upon the axle, whereby the power of the springs may be saved and the vehicle allowed to run by gravity, substantially as set forth.

5. The combination, with a body and running-gear of a vehicle, of a power-shaft, a gear thereon, springs for rotating said shaft, a bracket having bearings for a short shaft, a gear mounted upon said short shaft and meshing with the gear upon the power-shaft, a transverse shaft provided upon opposite ends with balance-wheels, and also having mounted thereon a gear which meshes with the gear upon the short shaft, and a lever pivoted to a cross-piece upon the bracket and provided with a downhanging spring-actuated arm and bent end, substantially as set forth.

In testimony whereof I affix my signature in presence of two witnesses.

JOHN McDONALD ROGERS.

Witnesses:
WM. E. HARDWICK,
WILLIAM B. CARTER.